(12) United States Patent
Yu et al.

(10) Patent No.: US 11,852,245 B2
(45) Date of Patent: Dec. 26, 2023

(54) DEVICE FOR ADJUSTING AND COMPENSATING WORKING WEAR GAPS OF FLOATING SEAL RING

(71) Applicant: WUHAN XINHUAFENG MACHINERY MANUFACTURING CO., LTD, Hubei (CN)

(72) Inventors: Zhenghao Yu, Hubei (CN); Sichun Yu, Hubei (CN)

(73) Assignee: WUHAN XINHUAFENG MACHINERY MANUFACTURING CO., LTD, Hubei (CN)

( * ) Notice: Subject to any disclaimer, the term of this patent is extended or adjusted under 35 U.S.C. 154(b) by 203 days.

(21) Appl. No.: 17/616,698

(22) PCT Filed: Aug. 10, 2020

(86) PCT No.: PCT/CN2020/108038
§ 371 (c)(1),
(2) Date: Dec. 6, 2021

(87) PCT Pub. No.: WO2021/082605
PCT Pub. Date: May 6, 2021

(65) Prior Publication Data
US 2022/0349479 A1    Nov. 3, 2022

(30) Foreign Application Priority Data
Oct. 31, 2019   (CN) .......................... 201911050653.X

(51) Int. Cl.
*F16J 15/34* (2006.01)
*F16J 15/44* (2006.01)

(52) U.S. Cl.
CPC .......... *F16J 15/445* (2013.01); *F16J 15/3464* (2013.01); *F16J 15/3492* (2013.01); *F16J 15/441* (2013.01)

(58) Field of Classification Search
CPC ..... F16J 15/445; F16J 15/3464; F16J 15/3492
See application file for complete search history.

(56) References Cited

U.S. PATENT DOCUMENTS 3,747,479 A * 7/1973 Nightingale ............. F16J 15/32
604/219
4,412,747 A * 11/1983 Moriyama ........... F16J 15/3448
366/64

(Continued)

FOREIGN PATENT DOCUMENTS

CN    103057612 A    4/2013
CN    105793147 A    7/2016

(Continued)

*Primary Examiner* — Vishal A Patel

(57) ABSTRACT

A device for adjusting and compensating working wear gaps of a floating seal ring, which is provided on a movable seat chamber, a floating seal ring and a rubber ring are provided in the movable seat chamber, the movable seat chamber and the shaft are sealed by a shaft sealing rubber ring, wherein: adjusting screw holes are provided on a center of the shaft along an axial direction, a bayonet slot for penetrating the shaft is provided on an outer side of the shaft along a radial direction, a bayonet is provided in the bayonet slot, and a locking groove is provided on an end portion of the movable seat chamber, an adjusting screw inserted into the adjusting screw hole is provided on an end portion of the shaft.

8 Claims, 2 Drawing Sheets

(56) References Cited

U.S. PATENT DOCUMENTS

| | | | | |
|---|---|---|---|---|
| 4,643,437 A * | 2/1987 | Salant | ............... | F16J 15/3432 |
| | | | | 277/377 |
| 4,997,191 A * | 3/1991 | Warner | ............... | F16J 15/3464 |
| | | | | 277/377 |
| 6,592,127 B1 * | 7/2003 | Flower | ............... | F16J 15/188 |
| | | | | 277/411 |
| 2006/0021992 A1 * | 2/2006 | Narushima | ............. | F16J 13/20 |
| | | | | 220/817 |

FOREIGN PATENT DOCUMENTS

| | | |
|---|---|---|
| CN | 106481818 A | 3/2017 |
| CN | 110671499 A | 1/2020 |
| CN | 211315103 U | 8/2020 |
| JP | 2000229588 A | 8/2000 |

\* cited by examiner

DEVICE FOR ADJUSTING AND COMPENSATING WORKING WEAR GAPS OF FLOATING SEAL RING

BACKGROUND OF THE PRESENT INVENTION

Field of Invention

The present invention relates to the field of mechanical manufacturing, and more particular to a device for adjusting and compensating working wear gaps of a floating seal ring.

Description of Related Arts

Sealing performance and service life are the core indicators of quality of the floating oil seal. The occurrence of oil leakage is a key sign indicating seal failure of the floating seal ring. There are many reasons for oil leakage, wherein the long working time and the insufficient elasticity of the rubber ring cannot compensate for the wear of the working surfaces of the two iron rings, making the gap between the bonding surfaces larger to cause leakage, which is the most direct and common cause. At this time, replacing the floating seal is the only option. However, if the design can be changed so that the installation and working pressure are set, the floating seal ring can be varied and adjusted, and random wear compensation can be performed, in such a manner that the service life of the floating seal ring can be doubled. This is undoubtedly making full use of the material and making full use of the material to maximize the superior functions of the floating oil seal, which is capable of bringing huge economic and social benefits, realizing energy conservation and environmental protection, saving resources, reduce costs, improving the rate of equipment use, and benefiting the society.

SUMMARY OF THE PRESENT INVENTION

An object of the present invention is to provide a device for adjusting and compensating a working wear gap of a floating seal ring, which is capable of adjusting and compensating the working wear gap of the floating seal ring, so as to prolong a service life of a floating oil seal.

Technical solutions of the present invention are as follows.

A device for adjusting and compensating working wear gaps of a floating seal ring, which is provided on a movable seat chamber, a floating seal ring and a rubber ring are provided in the movable seat chamber, the movable seat chamber and the shaft are sealed by a shaft sealing rubber ring, wherein: adjusting screw holes are provided on a center of the shaft along an axial direction, a bayonet slot for penetrating the shaft is provided on an outer side of the shaft along a radial direction, a bayonet is provided in the bayonet slot, and a locking groove is provided on an end portion of the movable seat chamber, an adjusting screw inserted into the adjusting screw hole is provided on an end portion of the shaft, wherein a first end of the adjusting screw is located outside the end portion of the shaft, a second end of the adjusting screw passes through the adjusting screw hole and contacts a first end of the bayonet, and a second end of the bayonet is located in the locking groove of the movable seat chamber for pushing the moving seat chamber.

Preferably, a protective cover covering the end of the shaft is also provided on the end portion of the movable seat cavity.

Preferably, the protective cover is connected with a side wall of the movable seat cavity by threads.

Preferably, a first end of the bayonet slot is located outside the movable seat cavity, and a second end of the bayonet slot extends into the movable seat cavity, and a length of the bayonet slot extended to the inside of the movable seat cavity is at least 6-10 mm.

Preferably, the length of the bayonet slot outside the movable seat chamber is identical to a width of the bayonet, so as to facilitate installation of the bayonet.

Preferably, a length of the bayonet is greater than a diameter of the shaft; the bayonet passes through a pin hole provided on an end of the bayonet slot for facilitating insertion of the plug.

Preferably, the bayonet is locked into the locking groove of the movable seat chamber at an exposed part of the shaft, so as to form an integral linkage of the bayonet, the shaft and the movable seat chamber, which rotates along the shaft.

Preferably, a gap a between the movable seat chamber and an end surface of a static seat chamber is in a range of 8-10 mm.

Compared with the conventional art, the beneficial effect of the present invention is as follows. By adjusting the screw to push the bayonet, the movable seat chamber is pushed, so as to achieve the purpose of adjusting and compensating the working wear gap of the floating seal ring, and realize the variable adjustment. Random wear compensation can be performed, and the service life of the floating seal ring can be doubled. The whole device is simple in structure, easy to operate, energy saving, environmental protection, resource saving, cost reduction, and improvement of the equipment intact rate, which is beneficial to society.

DETAILED DESCRIPTION OF THE PREFERRED EMBODIMENT

The technical solutions in the embodiments of the present invention will be described clearly and completely in conjunction with the accompanying drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

Technical solution of the present invention.

Figure 1:
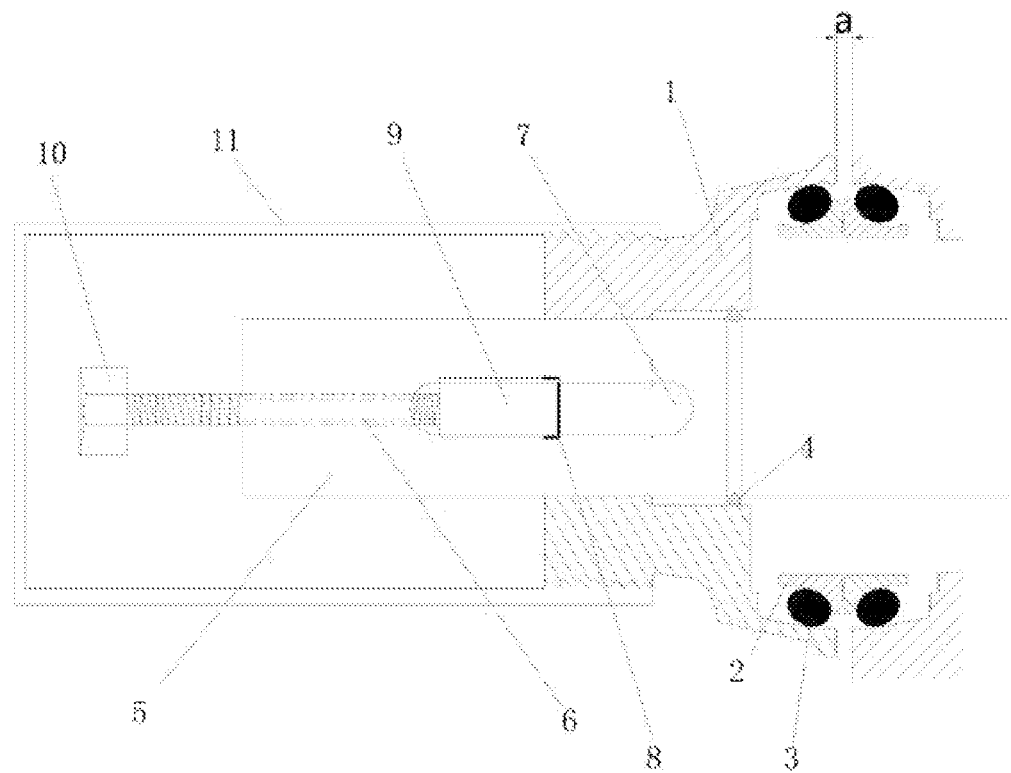
FIG. 1 is a structural schematic diagram from an overall top view according to a preferred embodiment of the present invention.
Figure 2:
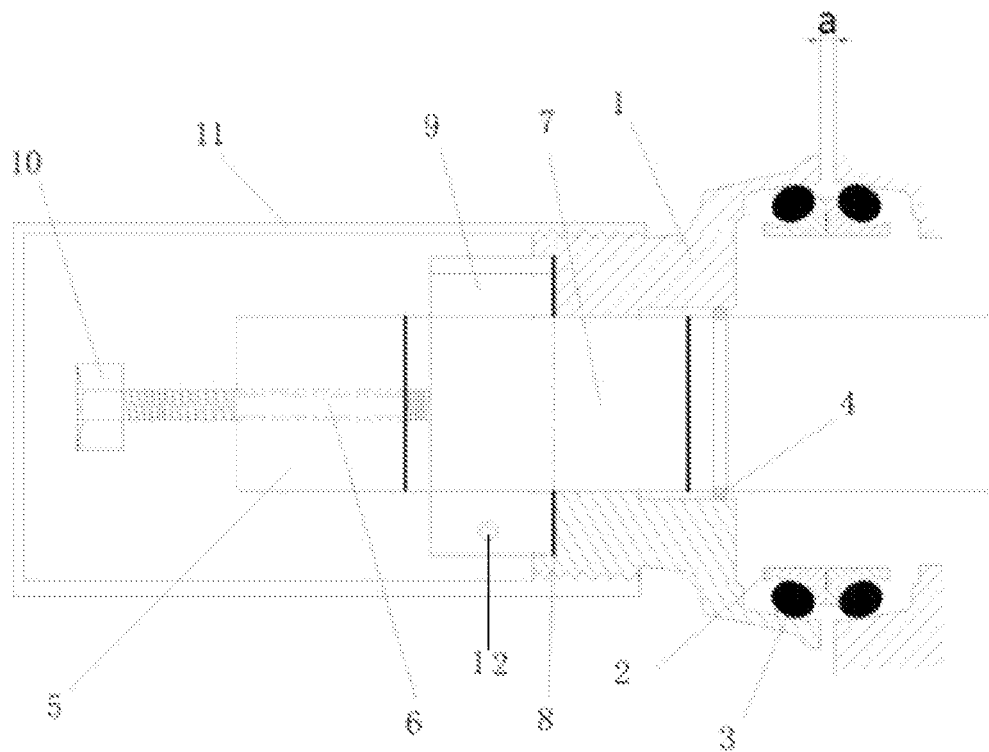
FIG. 2 is a structural schematic diagram from an overall front view according to the preferred embodiment of the present invention.
Figure 3:
FIG. 3 is a structural schematic diagram of a bayonet according to the preferred embodiment of the present invention.

Referring to FIG. 1 and FIG. 2, a device for adjusting and compensating working wear gaps of a floating seal ring, which is provided on a movable seat chamber 1, a floating seal ring 2 and a rubber ring 3 are provided in the movable seat chamber 1, the movable seat chamber 1 and the shaft 5 are sealed by a shaft sealing rubber ring 4, wherein: adjusting screw holes 6 are provided on a center of the shaft 5 along an axial direction, a bayonet slot 7 for penetrating the shaft 5 is provided on an outer side of the shaft 5 along a radial direction, a bayonet 9 is provided in the bayonet slot 7, and a locking groove 8 is provided on an end portion of the movable seat chamber 1, an adjusting screw 10 inserted into the adjusting screw hole 6 is provided on an end portion of the shaft 5, wherein a first end of the adjusting screw 10 is located outside the end portion of the shaft 5, a second end of the adjusting screw 10 passes through the adjusting screw hole 6 and contacts a first end of the bayonet 9, and a second end of the bayonet 9 is located in the locking groove 8 of the movable seat chamber 1 for pushing the moving seat chamber 1.

Preferably, wherein a protective cover 11 covering the end of the shaft 5 is also provided on the end portion of the movable seat cavity 1.

Preferably, the protective cover 11 is connected with a side wall of the movable seat cavity 1 by threads.

Preferably, a first end of the bayonet slot 7 is located outside the movable seat cavity (1), and a second end of the bayonet slot 7 extends into the movable seat cavity 1, and a length of the bayonet slot 7 extended to the inside of the movable seat cavity 1 is at least 6-10 mm, which is exactly the stroke range of the bayonet pin used to adjust the gap between the large end faces of the two chambers.

Preferably, the length of the bayonet slot 7 outside the movable seat chamber 1 is identical to a width of the bayonet 9, so as to facilitate installation of the bayonet 9.

The invention aims at the key factor of the working principle of the floating oil seal, that is, the working surface of the floating seal ring, which requires that an oil film be easily formed without oil leakage. This requires the floating seal ring to maintain a very appropriate axial pressure from installation to the end of its working life. This kind of proper pressure is the strength of the working surfaces of the two floating seal rings, which seals the oil and does not cause dry grinding. The reality is that once the floating oil seal is installed, the pressure is fixed for life and cannot be changed.

It is particularly unfavorable that most of the designs are under high pressure, thinking that if the pressure is too high, the oil sealing effect will be better. Little does it know that the greater the pressure, the greater the damage to the floating seal. Because the pressure is too high, the working surface of the floating seal iron ring fits too tightly, it is difficult to form a gap, and no oil film is formed at all. The working surface of the two iron rings is dry grinding until the dry grinding wear makes the wear-resistant layer of the working surface thin. As a result, the pressure of the entire oil seal ring is reduced, an oil film is formed on the working surface, and the floating oil seal truly enters the correct state of use. However, at this time, the floating seal was seriously injured and worked with illness. As the bright belt of the hoop working surface was severely damaged by dry grinding, the quality of flatness and smoothness has long been lost. It depends on the elasticity of the rubber ring to keep working. How long this can last is only left to fate.

At the same time, the strong pressure makes the working surface of the floating seal iron ring dry, which is easy to produce high temperature, and the high temperature conduction to the rubber ring will cause great damage to the rubber ring, which will quickly age and become rigid. Once so, oil leakage will soon occur. All these misfortunes are caused by the wrong design concept of "pressing to seal the oil" and "one pressing for life". When the iron ring loses its thickness due to long-term wear, the rubber ring becomes stiff and aging due to long working hours, the resilience drops, and the gap is weak. External force is needed to follow up the feed force, and the floating oil seals can continue to maintain each other from the axial direction. The strength of the fit is just enough to form an oil film without causing oil to leak out. At this time, the floating seal has not failed, and it can continue to work for a long time. This will change the previous misunderstanding that once the floating oil seal is installed in place, the pressure is fixed for life. It is necessary to correctly understand the working principle of the floating oil seal, install and use according to the product characteristics, and at the same time set the pressure force for the equipment where the floating oil seal is located, the actual working conditions and environmental conditions to be faced, and it must be correctly optimized. The initial pressure design during installation; after working for a period of time, in view of the wear of the iron ring and the looseness of the fitting surface, the force is tightened again, so as to follow up in a timely manner and gradually adjust the pressing force to make the 2 floating seal iron rings work. The mating surface always maintains a proper pressure to fit, which not only seals the oil, but also forms an oil film, and does not cause dry grinding problems. In the same way, the pressure was moderately applied during the initial installation, and the rubber ring was not damaged by strong pressure. Its normal performance was slowing down in aging and stiffness, and prolonging the working life. This is to implement proper pressure for the initial installation, follow up the pressure properly for subsequent wear, and then follow up with proper pressure until the pressure is invalid. At this time, the rubber ring is completely stiff and aging, has no elasticity, and completely loses its function. However, this process is twice or more than several times longer than the "one pressure for life" use method.

It can be seen that for the installation and use of floating oil seals, what needs to be particularly opposed is the erroneous concept of "the tighter the oil can be sealed". The concept that the working surface of the two iron rings and the bright belt can not only to form an oil film, work under lubrication, but also seal the oil with correct, reasonable and appropriate pressure should be showed. Adapt to the characteristics of floating seals and use floating seals correctly. Theoretically, there is an oil film between the working surfaces of the two iron ring bright belts for lubrication. Without dry grinding, its life will never be bad. But the rubber ring must be aging and rigid, and the life span is limited. The invention can improve the improper pressure of the rubber ring, prevent the rapid aging of the rubber ring caused by the high temperature corrosion damage caused by the dry grinding of the iron ring, and correctly use the floating oil seal. As long as the pressure is appropriate and the working surface of the iron ring is lubricated with an oil film, the working life of the iron ring can be extended several times; it can also make the rubber ring age, delay the stiffness time as much as possible, and double the service life. Only in this way can the function of floating seal be used correctly, and the scientific use of floating seals can maximize the advantages of floating oil seal products, excavate the material to the best of its ability, and make the best use of its economic value and social benefits. However, the actual situation at home and abroad in the past is that once the floating oil seal is installed, the pressure must be for life. Usually the pressure is too high and too tight, the working surface of the iron ring wears faster, even when the pressure is too high, the working surface of the two iron rings is easy to dry and heat, and the high temperature generated is the most direct harm to the rapid aging and stiffness of the rubber ring. At the same time, excessive pressure not only accelerates the stiffness and aging failure of the rubber ring, but also causes the rubber ring to break and tear under strong pressure. Even if the floating seal ring has withstood the early strong pressure, after the iron ring wears, the thickness of the working surface becomes thinner, which can make a part of the space and reduce the pressure on the rubber ring a little, but as time goes by, the iron ring will stick to it due to wear The surface clearance becomes larger, and the stiffness and aging of the rubber ring accelerates under high temperature and high pressure, and the resilience of the rubber ring becomes weak. At this time, the resilience cannot be used to compensate for the continuous wear of the iron ring, and more gaps are allowed. At this time, the working surface of the iron ring does not fit tightly, and the oil film is easier to form, but because the resilience of the rubber ring is getting stiff due to aging, it is no longer able to use the resilience to make up for the expanding gap, and it is not far from the oil leakage at this time. From this, it is known that the original floating seal ring and the seat cavity installation have major defects and misunderstandings in the design, that is, "strongly press it, one pressure is fixed for life", which is the biggest damage to the service life of the floating seal ring, stifling with its due good performance advantages, the expected use effect and life span of the floating seal ring is ruined.

Push the ejector pin by screwing in the adjusting screw, and pass the ejector pin from the axial direction, and the snap pin pushes against the seat cavity to make the two floating seal rings close to each other, which not only seals the oil, but also makes the iron ring work brightly. With oil film lubrication on the belt surface, this pressure is the most appropriate strength. After working for a long period of time, when oil leakage occurs on the bonding surface of the floating seal iron ring, the adjustment screw can be screwed in to make up for the slack and looseness caused by the wear of the iron ring and insufficient elasticity of the rubber ring, so that the floating seal ring can be restored properly. Adhesion force, continue to seal oil work, through the adjustment of this screw can implement over-tightening pressure relief, over-loosening pressurization; timely and moderately adjustable, always maintain the correct and moderate axial compression force that should be maintained continuously. Correctly use floating seals to completely solve the problem 1. The initial installation pressure is too large and the floating seal is damaged; 2. The fitting surface of the iron ring is dry ground due to excessive installation, and the apron is over-stressed, which accelerates the aging; 3. This kind of human error the installation and use of floating seals humiliates the performance of the entire equipment and the status quo that the floating seals are wronged.

Although the embodiments of the present invention have been shown and described, those of ordinary skill in the art can understand that various changes, modifications, and substitutions can be made to these embodiments without departing from the principle and spirit of the present invention. The scope of the present invention is defined by the appended claims and variations of their equivalents.

What is claimed is:

1. A seal assembly comprising a mechanical seal and a device adjusting and compensating working wear gaps of a floating seal ring of the mechanical seal, which is provided on a movable seat chamber, the floating seal ring and a rubber ring are provided in the movable seat chamber, the movable seat chamber and the shaft are sealed by a shaft sealing rubber ring, wherein: adjusting screw holes are provided on a center of the shaft along an axial direction, a bayonet slot for penetrating the shaft is provided on an outer side of the shaft along a radial direction, a bayonet is provided in the bayonet slot, and a locking groove is provided on an end portion of the movable seat chamber, an adjusting screw inserted into the adjusting screw hole is provided on an end portion of the shaft, wherein a first end of the adjusting screw is located outside the end portion of the shaft, a second end of the adjusting screw passes through the adjusting screw hole and contacts a first end of the bayonet, and a second end of the bayonet is located in the locking groove of the movable seat chamber for pushing the moving seat chamber.

2. The seal assembly, as recited in claim 1, wherein a protective cover covering the end of the shaft is also provided on the end portion of the movable seat cavity.

3. The seal assembly, as recited in claim 2, wherein the protective cover is connected with a side wall of the movable seat cavity by threads.

4. The seal assembly, as recited in claim 1, wherein a first end of the bayonet slot is located outside the movable seat cavity, and a second end of the bayonet slot extends into the movable seat cavity, and a length of the bayonet slot extended to the inside of the movable seat cavity is at least 6-10 mm.

5. The seal assembly, as recited in claim 4, wherein the length of the bayonet slot outside the movable seat chamber is identical to a width of the bayonet, so as to facilitate installation of the bayonet.

6. The seal assembly, as recited in claim 4, wherein a length of the bayonet is greater than a diameter of the shaft; the bayonet passes through a pin hole provided on an end of the bayonet slot for facilitating insertion of the plug.

7. The seal assembly, as recited in claim 4, wherein the bayonet is locked into the locking groove of the movable seat chamber at an exposed part of the shaft, so as to form an integral linkage of the bayonet, the shaft and the movable seat chamber, which rotates along the shaft.

8. The seal assembly, as recited in claim 4, wherein a gap a between the movable seat chamber and an end surface of a static seat chamber is in a range of 8-10 mm.

* * * * *